Figure 1:
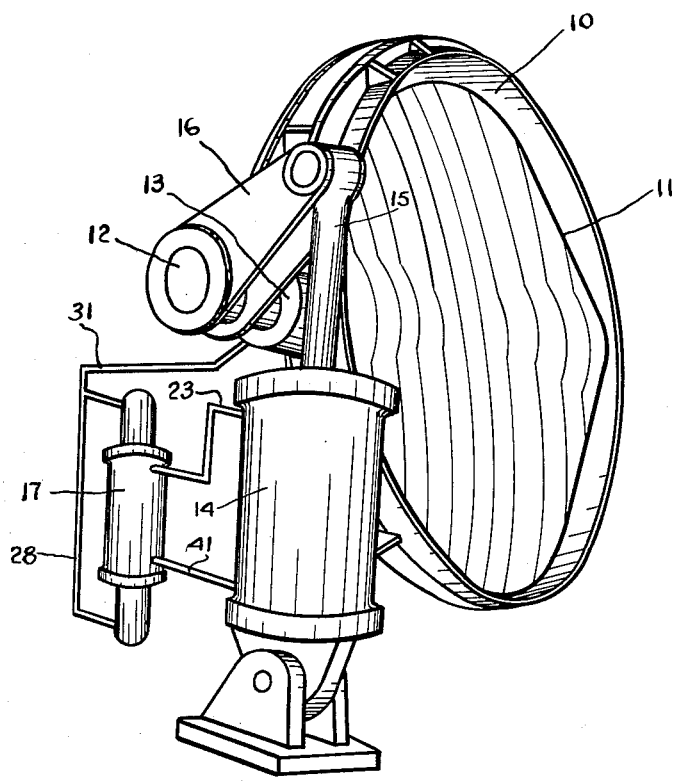

Dec. 7, 1965    R. J. SIMPSON    3,221,839
LUBRICATING SYSTEM

Filed Aug. 12, 1963    2 Sheets-Sheet 1

INVENTOR.
ROBERT J. SIMPSON
BY
ATTORNEY.

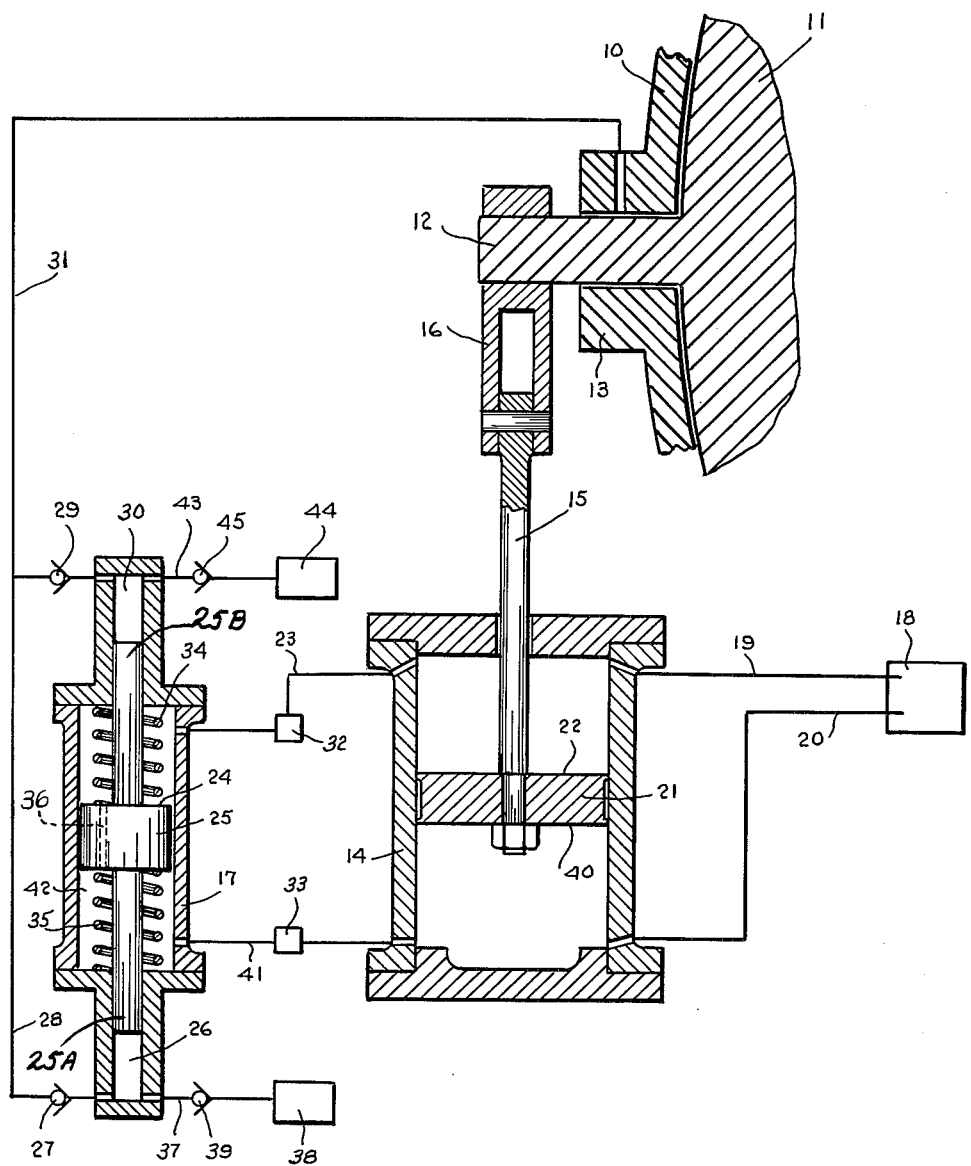

3,221,839
LUBRICATING SYSTEM
Robert J. Simpson, Chippawa, Ontario, Canada, assignor to Dominion Engineering Works, Limited
Filed Aug. 12, 1963, Ser. No. 301,345
5 Claims. (Cl. 184—6)

This invention relates to an automatic, pre-motion lubricating system and has reference to means for supplying lubricant at the required pressure to bearings, where relative movement between shaft and bearing occurs at random intervals. It has specific reference to machines which are normally actuated by hydraulic servomotors or operating cylinders, such as for example, spherical valves, butterfly valves, rotor blades of Kaplan type turbines or pump-turbines, hydraulic press ways and other similar devices in which lubrication of the bearing is essential prior to movement. For actuation of the lubricating device this invention utilizes the pressure differential in a hydraulic servomotor or operating cylinder.

Conventional methods of lubricating bearings for machines of the type described are as follows:
 (a) Manual lubrication as part of a regular maintenance schedule;
 (b) Lubrication by means of an automatic lubricator using a timing device or electrical interlocks within the mechanism's control circuit.

The above mentioned methods suffer from disadvantages. With regard to the method described at (a), this is expensive; it requires manual labor on a regular maintenance schedule; it tends to be unreliable as it depends on the human element to carry out the lubrication when required. Method (b) is more expensive than (a) and requires the installation of complex equipment. By adding the necessary interlocks to make method (b) function effectively, the system becomes more complex and prohibitively expensive.

For clarity of presentation, this invention is illustrated and described as applied to a typical butterfly valve for hydraulic service. It will be understood that this is by way of illustration only and may be equally well applied to other mechanisms such as has been described above, without limiting either the scope or spirit of the invention.

Referring to the drawings:
FIG. 1 is a perspective view of a butterfly valve incorporating the present invention; and
FIG. 2 is a schematic diagram of the hydraulic and lubricating circuits for the butterfly valve incorporating the present invention.

Referring more particularly to the drawings wherein similar reference characters designate corresponding parts throughout and with particular reference to FIG. 1, the butterfly valve shown therein comprises a valve body 10 in which a valve disc 11 is rotatably mounted by means of trunnions 12 which are journalled in bearings 13. Bearings 13 are rigidly supported in body 10.

It will be understood that although only one trunnion 12 and bearing 13 is shown in the drawings, a similar pair of these components exist diametrically opposite those illustrated.

The force required to open or close disc 11 is provided by servomotor 14. This force is transmitted by way of piston rod 15 to lever 16 which is rigidly attached to trunnion 12.

In installations such as has been described in reference to a butterfly valve, the angular setting of disc 11 may remain unchanged for extended periods. Therefore, when disc 11 is required to adopt a different setting for any reason, means must be provided to lubricate bearings 13 just before trunnions 12 are moved.

I have invented such means, which is a pre-motion lubricator and is shown generally at 17 in FIG. 1.

With reference to FIG. 2, which shows details of my invention, when disc 11 is to be moved to a more open position, control valve 18 supplies oil under pressure by way of a conduit 19 to the cylinder of servomotor 14. The oil pressure on side 22 of piston 21 must be increased to overcome static friction before valve disc 11 can move. As the pressure in conduit 19 increases, this pressure is transmitted by way of conduit 23 to the pre-motion lubricator 17 and applies pressure to side 24 of piston 25 thereby causing piston 25 to move downwards. The movement of piston 25 applies pressure by way of piston extension 25A to the lubricant contained in chamber 26 and forces the lubricant past a simple check valve 27 into conduit 28. As a further check valve is provided at 29, the lubricant in conduit 28 flows into conduit 31 and thus to bearings 13.

Compression springs 34 and 35 are to return piston 25 to the central position in the cylinder of lubricator 17 after pressure has been reduced. Hole 36 through piston 25 permits operating fluid to flow from one side of said piston to the other whereby piston 25 may be restored to its central position by springs 34 and 35 when there is no differential pressure across piston 21 of servomotor 14.

When piston 25 returns to its central position, lubricant is drawn into chamber 26 through conduit 37 from reservoir 38 by way of non-return check valve 39.

If disc 11 is to be moved in the closing direction, then oil pressure from control valve 18 will be directed by means of conduit 20 to side 40 of piston 21 and a sequence of events will take place as has been described above, except that oil applies pressure to the lower side 41 of piston 25 moving it in the upward direction. Piston extension 25B thus applies pressure to the lubricant in chamber 30 forcing it into conduit 31 by way of check valve 29. Chamber 30 is supplied with lubricant through conduit 43 from reservoir 44 by way of non-return check valve 45 when piston 25 is returned to its central position by springs 34 and 35.

As will be seen from the foregoing, lubrication of the bearings 13 is essentially a "one-shot" operation. In other words, as soon as either piston extension 25A or 25B has completed its operating stroke and has supplied lubricant to the bearings 13, compression springs 34 and 35 return the piston 25 to its central position within the cylinder after pressure has been reduced, said piston 25 remaining in said central position within said cylinder until the servomotor cylinder is again actuated. It will be understood that said piston 25 completes its full stroke during which it supplies lubricant before the piston 21 actually moves the trunnion 12 in the bearing 13. It will, further, be understood that the compression springs 34 and 35 are utilized in the illustrated embodiment of the invention for the sake of convenience; and the apparatus provided by the present invention will readily function without said springs 34 and 35.

It will be seen from the foregoing description that I have provided an automatic pre-motion lubricator for the lubrication of bearings before motion is initiated in either direction.

Although the servomotor operating fluid and, therefore, also the pre-motion lubricator actuating fluid in this invention has been described as oil under pressure, this is by way of example only. The device would function equally well with other fluids.

From the foregoing, it will be seen that I have provided new and improved means for accomplishing all of the objects and advantages of the invention.

I claim:
1. In combination with a hydraulic powered servo motor adapted to move a driven member relative to sta- tionary structure by application of pressurized working liquid from a pressure source to the servo motor, a pre-motion lubricating means for lubricating said driven member substantially prior to said relative movement, comprising; lubricating pump means having a lubricant pressurizing chamber, lubricant conducting conduit means connecting the output of said lubricant pressurizing chamber with said driven member for passage of lubricant thereto, a fluid motor in driving connection with said lubricating pump, and pressure fluid conduit means connecting said fluid motor with the pressure source of said servo motor, whereby on supplying said working liquid from said pressure source to operate said servo motor, said working liquid operates said fluid motor substantially prior to the operation of said servo motor, to drive said pump, causing lubrication of said driven member by said lubricating pump substantially prior to move of said driven member by said servo motor.

2. A pre-motion lubricating means as claimed in claim 1, wherein said lubricating pump means and said fluid motor are of the reciprocating type, each having a piston reciprocating in a cylinder.

3. A pre-motion lubricating means as claimed in claim 2 wherein said fluid motor is of the double-acting type having fluid connection to the forward and the reverse working liquid connections of said servo motor, whereby operation of said servo motor in forward or reverse direction produces lubrication of said driven member by said pump.

4. A pre-motion lubricating means as claimed in claim 2 further comprising lubricant reservoir means connected with said lubricant pump through one-way valve structure whereby movement of said pump in reverse motion induces supply of lubricant to the pump pressurizing chamber from the lubricant reservoir means.

5. A combined lubricator pump and fluid powered motor for use with a member driven by a servo motor powered by a source of pressurized fluid, to provide lubrication of said driven member substantially prior to forward or return movement thereof when driven by the servo motor, comprising: a double-acting fluid motor, adapted in use for connection in parallel with the pressurized source of working fluid of said servo motor, having a centrally arranged piston sliding in a cylinder, said piston having rod extensions extending axially therefrom in pumping relation within a pair of lubricating pump chambers arranged oppositely of one another relative to said cylinder, return spring means adapted to return said piston to said intermediate position within said cylinder on release of working fluid pressure therefrom, a passage extending generally axially through said motor piston to permit limited flow of working fluid from one side of said piston to the other side thereof, thereby permitting substantially free return piston movement under the action of said spring means, lubricant supply means connected with said lubricant pump chambers by way of non-return valves to supply lubricant thereto on respective return movement of said piston rod extensions, and conduit means for connecting the output of said lubricant pump with said driven member, whereby, when connected in use, the supply of working fluid from said source of pressurized fluid to said servo motor produces an operative stroke of said fluid powered motor causing said pump to lubricate said driven member substantially prior to movement thereof under the driving influence of said servo motor.

References Cited by the Examiner
UNITED STATES PATENTS

| | | | |
|---|---|---|---|
| 2,055,449 | 9/1936 | Beckwith | 137—246.13 |
| 2,988,172 | 9/1961 | Fry | 184—28 |
| 3,052,317 | 9/1962 | Leach. | |
| 3,111,958 | 11/1963 | Hore | 137—246.13 |

LAVERNE D. GEIGER, *Primary Examiner.*

MILTON KAUFMAN, *Examiner.*